3,227,617
FLUORIDE DENTIFRICE COMPOSITION
Roderick David Manahan, Dunellen, and Virgil John Richter, West Orange, N.J., assignors to Colgate-Palmolive Company, New York, N.Y., a corporation of Delaware
No Drawing. Filed Mar. 14, 1957, Ser. No. 645,911
28 Claims. (Cl. 167—93)

The present application is a continuation-in-part of application Serial No. 503,805, filed April 25, 1955, which is a continuation-in-part of Serial No. 467,622, filed November 8, 1954, application Serial No. 503,806, filed April 25, 1955, and application Serial No. 587,931, filed May 29, 1956, all now abandoned.

The present invention relates to a dentifrice preparation comprising a fluoride compound which releases fluoride ions in water and a compatible polishing material comprising a mixture of insoluble alkali metal metaphosphate and insoluble calcium or magnesium polishing agents, as hereinafter described and claimed.

Certain fluoride compounds have been used as additives to drinking water or for topical application on the teeth in the form of an aqueous solution. By such application, it is believed generally that the fluoride renders the tooth structure more resistant to the effect of acid in the mouth.

It has been proposed that fluoride compounds be incorporated in dentifrices. Enamel solubility tests have shown that the effectiveness of water-soluble fluorides such as sodium fluoride is diminished when used in the presence of certain dentifrice constituents such as calcium carbonate, dicalcium phosphate or similar materials as shown by Bibby, The Journal of the American Dental Association, vol. 34, January 1, 1947, pages 26–32. It has been found that such calcium-containing phosphates, e.g. di- and tricalcium orthophosphates, remove the soluble fluoride from solution as described by MacIntire et al. and Adler et al. in Industrial and Engineering Chemistry, vol. 30, pages 160–162 and pages 163–165 respectively. It has been shown furthermore that the heat-treatment of such calcium-containing phosphates, e.g. about 500° C. for 15 to 30 minutes, results in a product which has substantially less adsorptive capacity for soluble fluoride, as shown for example by Current Science of India, November 1951, pages 293–4. It has been disclosed also that treatment of tooth enamel with a mixture of stannous fluoride, hydrogen peroxide and insoluble sodium metaphosphate increases the enamel hardness as described in The Journal of the American Dental Association, May 1950, vol. 40, pages 513–519.

A large variety of polishing agents for dentifrice compositions is known in the art, including insoluble sodium metaphosphate as disclosed in U.S. Patent No. 2,019,142. It has been proposed that various calcium or magnesium compounds may be admixed with insoluble sodium metaphosphate in order to modify certain physical properties of the compositions as disclosed in U.S. Patents Nos. 2,216,816 and 2,216,821 for example.

It has now been found that a fluoride compound releasing fluoride ions in water is compatible with mixtures of insoluble alkali metal metaphosphate and calcium or magnesium inorganic salts as a polishing material. Such dentifrice preparations are highly effective for the care and hygiene of the mouth, and exhibit superior characteristics for the protection of the teeth against tooth decay. It has been found in enamel solubility tests that such mixtures of polishing agents with fluoride ion inhibit the solubility of enamel in acid solutions and may even enhance the effect of the fluoride, particularly sodium fluoride. In addition, such effects do not appear to be decreased upon aging, but rather the beneficial properties are maintained at high levels of activity for comparatively long periods of time as compared to dentifrices containing fluoride and a calcium or magnesium salt as the sole polishing material.

The fluoride compound should dissociate or release fluoride ions in water, though the fluoride compound may be of slight or limited solubility or fully water-soluble in solution. The term "fluoride ions" refers to ionized fluoride, e.g. F−, and to the fluoride in complex ions. It is preferred to use the inorganic fluoride salts, particularly the alkali metal or tin fluoride salts. Suitable examples are sodium fluoride, potassium fluoride, stannous fluoride, potassium stannous fluoride ($SnF_2 \cdot KF$), sodium hexafluorostannate or stannous chlorofluoride. In practice it has been found that particularly effective results are obtained with sodium fluoride or stannous fluoride.

Other fluoride salts which inhibit the solubility of enamel in acid and which may be employed in accordance with the present invention are ammonium fluoride, zinc fluoride, copper fluorides such as cuprous, fluoride, fluorosilicates such as sodium and ammonium fluorosilicate, fluorophosphates such as aluminum mono- and difluorophosphate, sodium, potassium and stannous fluorophosphate and the like.

The insoluble alkali metal metaphosphates are preferably the insoluble sodium and potassium salts of polymetaphosphoric acid. These materials are known in the art with the insoluble sodium metaphosphate having been suggested as a polishing agent as previously indicated. Such materials may be formed in any suitable manner, as illustrated by Thorpe's Dictionary of Applied Chemistry, vol. 9 (4th ed.), pp. 510–511. The forms of insoluble sodium metaphosphate known as Madrell's salt and Kurrol's salt are further examples of suitable materials. These metaphosphate salt exhibit only a minute solubility in water, and are commonly referred to as insoluble metaphosphates therefore. There is present a minor amount of soluble phosphate material as impurities, usually of the order of a few percent such as up to about 4% by weight. The amount of soluble phosphate material which is believed to be a soluble sodium trimetaphosphate in the case of insoluble sodium metaphosphate may be reduced by washing with water if desired.

Any substantially water-insoluble calcium or magnesium polishing agent may be used in admixture with the other essential ingredients. Suitable examples are calcium carbonate, dicalcium phosphate dihydrate, magnesium carbonate, trimagnesium phosphate or magnesium orthophosphate, tricalcium phosphate, calcium sulfate and the like. It is preferred to use a calcium phosphate polishing agent however. More particularly, it is preferred to employ anhydrous dicalcium phosphate ($CaHPO_4$) which may be used in any suitable form and particle size, and methods for its manufacture being known also.

Since these calcium or magnesium materials exhibit in varying degree a tendency to react with soluble fluorides, it is important to use only such proportions which do not substantially remove the fluoride ions from solution. The maximum amount of calcium or magnesium salts will vary, depending upon the nature of the calcium or magnesium salt and the type of dentifrice composition. In general, the insoluble alkali metal metaphosphate should be a major proportion (i.e. at least 50%) and the insoluble calcium or magnesium compound a minor proportion (i.e. up to 50%) of such mixtures. Effective mixtures will be found within the range of alkali metal metaphosphate to the alkaline earth metal compounds from about 100:1 to about 2:2 by weight, and usually about 50:1 to 4:1, depending upon the specific composition. Particularly effective results have been obtained with ratios of about 9:1 by weight of the alkali metal metaphosphate to the calcium or magnesium polishing agents.

In these dentifrice preparations, the mixture of specified polishing materials exerts the desired cleansing, abrasive and polishing properties for the teeth. In the case of dentifrices such as tooth pastes and tooth powders, the total content of polishing agents will be usually at least about 20%, such as about 20–99% by weight depending upon the specific composition. In tooth pastes, the polishing material will total about 20 to 75%, usually about 40 to 60%, whereas in tooth powders the polishing material will be usually about 70–95% by weight. This combination may be the sole polishing material or it may be admixed with a suitable proportion of other polishing materials such as alumina and the like, provided that they do not substantially adversely affect the special characteristics of the product.

The amount of fluoride compound is dependent to some extent upon the type of fluoride compound, its solubility and type of dentifrice composition, but should be an effective but non-toxic amount. As indicative thereof, a 2% aqueous solution of sodium fluoride has been used effectively for topical application which is equivalent to about 1% fluoride ion in solution. Dentifrice compositions containing a maximum of about 1% by weight fluorine, e.g. fluoride ion, are satisfactory. Any suitable minimum amount of fluoride may be used but it will be usual to employ an effective amount above 0.01% fluorine (100 p.p.m.). It is preferred that the amount of the fluoride salt be no more than 2%, and usually within the range of 0.05 to about 1%, by weight of the dentifrice composition, particularly for the alkali metal and tin fluorides.

There are described below the results of certain tests illustrating the effectiveness of compositions of the present invention in inhibiting the solubility of tooth enamel to acid solution.

Insoluble sodium metaphosphate (20 gms.) was mixed with each of the calcium-containing polishing materials (5 gms.) specified in Table I below, and with 100 ml. of a 0.2% solution of sodium fluoride for 15 minutes. The mixtures were filtered and each of the filtrates was mixed with 200 mgs. of powdered enamel for 15 minutes, after which the heated enamel was separated by screening, and then washed and dried. Samples of enamel from each treatment were tested then for solubility in acid solution. Each enamel sample (50 mg.) was put in 20 cc. of 0.2 molar sodium acetate: acetic acid buffer at a pH of 4 and shaken for one hour. The mixtures were analyzed for calcium dissolved by the acid in each case. The percent reduction in enamel solubility in acid may be calculated then for each mixture by comparing the amount of calcium dissolved by the acid after treatment with each mixture, with the amount dissolved from untreated enamel by the acid as the control. The results are set forth in Table I below.

TABLE I

| Polishing material: | Percent reduction in enamel solubility |
|---|---|
| Insoluble sodium metaphosphate+dicalcium phosphate dihydrate | 24.5 |
| Insoluble sodium metaphosphate+tricalcium phosphate | 24.5 |

The above results indicate that the combination of sodium fluoride with a mixture of insoluble sodium metaphosphate and a minor proportion of calcium-containing polishing agents inhibits the solubility of tooth enamel in acid solution.

Further tests following substantially the same procedure, except that 22.5 grams of insoluble sodium metaphosphate mixed with 2.5 grams of the materials specified below were shaken for one hour with 100 ml. of a 0.2% solution of stannous fluoride, gave the results set forth in Table II below.

TABLE II

| Polishing material: | Percent reduction in enamel solubility |
|---|---|
| Insoluble sodium metaphosphate with calcium carbonate | 25.5 |
| Insoluble sodium metaphosphate with tricalcium phosphate | 37.5 |
| Insoluble sodium metaphosphate with dicalcium phosphate dihydrate | 32.5 |

The above results indicate that the specified combinations of polishing agents are compatible with stannous fluoride and the mixture exerts a substantial reduction in the solubility of enamel in acid solution.

Any suitable surface active or detersive material may be included in the dentifrice compositions. Such materials are desirable to provide additional detersive, foaming and anti-bacterial properties depending upon the specific type of surface active material. These detergents are water-soluble organic compounds usually, and may be anionic, non-ionic or cationic in structure. It is preferred to use the water-soluble non-soap or synthetic organic detergents usually. Suitable detersive materials are known and include, for example, the water-soluble salts of higher fatty acid monoglyceride monosulfate detergent (e.g. sodium coconut fatty acid monoglyceride monosulfate), higher alkyl sulfate (e.g. sodium lauryl sulfate), alkyl aryl sulfonate (e.g. sodium dodecyl benzene sulfonate), higher fatty acid esters of 1,2 dihydroxy propane sulfonate (e.g. sodium coconut fatty acid ester of 1,2 dihydroxy propane sulfonate), and the like.

The various surface active materials may be used in any suitable amount, generally from about 0.05 to about 10% by weight, and preferably from about 0.5 to 5% by weight of the dentifrice composition.

It is a further embodiment of the present invention to use the substantially saturated higher aliphatic acyl amides of lower aliphatic amino carboxylic acid compounds, such as those having 12 to 16 carbons in the acyl radical, and as more particularly described in U.S. Patent No. 2,689,170, issued September 14, 1954. The amino acid portion is derived generally from the lower aliphatic saturated monoaminocarboxylic acids having about 2 to 6 carbons, usually the monocarboxylic acid compounds. Suitable compounds are the fatty acid amides of glycine, sarcosine, alanine, 3-amino-propanoic acid and valine having about 12 to 16 carbons in the acyl group. It is preferred to use the N-lauroyl, myristoyl and palmitoyl sarcoside compounds however for optimum effects.

The amide compounds may be employed in the form of the free acid or preferably as the water-soluble salts thereof, such as the alkali metal, ammonium, amine and alkylolamine salts. Specific examples thereof are sodium and potassium N-lauroyl, myristoyl and palmitoyl sarcosides, ammonium and ethanolamine N-lauroyl sarcosides, N-lauroyl sarcosine, and sodium N-lauroyl glycide and alanine. For convenience herein, reference to "amino carboxylic acid compound," "sarcoside," and the like refers to such compounds having a free carboxylic group or the water-soluble carboxylate salts.

Such materials are utilized in pure or substantially pure form. They should be as free as practicable from soap or similar higher fatty acid material which tends to reduce the activity of these compounds. In usual practice, the amount of such higher fatty acid material is less than 15% by weight of the amide and insufficient to substantially adversely affect it, and preferably less than about 10% of said amide material.

A preferred embodiment relates to a dentifrice preparation comprising said fluoride material, said amide compound and a mixture of insoluble sodium metaphosphate and anhydrous dicalcium phosphate as a polishing material. Such dental composition exhibits a prolonged and marked effect in the inhibition of acid from fermentable carbohydrates by the oral flora, and a marked increase in the resistance (lowering solubility) of tooth enamel to acid solutions. There is produced thereby dual protective mechanisms acting sumultaneously to inhibit caries.

In accordance with the present invention, the specified combinations of ingredients may be used in any suitable preparation designed for application to the oral cavity which is referred to herein as a dentifrice preparation. Such dentifrices may be in a solid, liquid or paste form and include tooth pastes or dental creams, tooth powders, liquid dentifrices and the like.

In the preparation of tooth powders, it is usually sufficient to mechanically admix the various solid ingredients.

In dental cream formulations, the liquids and solids should necessarily be proportioned to form a creamy mass of desired consistency which is extrudible from a collapsible aluminum or lead tube for example. In general, the liquids in the dental cream will comprise chiefly water, glycerine, sorbitol, propylene glycol, or the like, including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like materials, e.g. Irish Moss, gum tragacanth, sodium carboxymethylcellulose, polyvinylpyrrolidone, starch and the like, usually in an amount up to about 10% and preferably about 0.5–5% by weight of the formulation.

Other types of dentifrice compositions will be formulated in known manner also.

A minor amount of hydrated aluminum oxide may be incorporated in the dentifrice preparation. More particularly, a dental cream having improved physical properties may be prepared from a mixture of the insoluble alkali metal metaphosphate and an insoluble calcium salt suspended in a gel comprising water, humectant and gelling agent, with said fluoride compound and organic non-soap sythetic detergent, and a minor amount of hydrated aluminum oxide, said dental cream having a pH from about 5 to 6.5. These dental creams exhibit a superior degree of stability to aging for long periods of time, particularly at elevated temperatures. The aluminum oxide acts as a stablizing and modifying agent so as to eliminate or inhibit any tendency for separation or "bleeding" of the dental cream in the collapsible tube.

Suitable examples of hydrated aluminum oxide which may be employed are the forms known as alpha and beta aluminum oxide trihydrate and mixtures thereof. It is used usually in the form of fine particles of any desired particle size in the manufacture of the dental cream. In practice, it is preferred to use the alpha trihydrate form of which at least about 90% of the particles pass through on a U.S. standard No. 325 mesh sieve and not more than about 5% of the particles by weight are less than 5 microns. It has been found that amounts of hydrated aluminum oxide from about ¼ to about 10% by weight are most desirable. In commercial practice it is preferred that the dental cream comprise the insoluble metaphosphate in an amount from about 40 to 50%, a calcium phosphate in an amount from ½ to 10%, and the hydrated aluminum oxide from about ½ to 10%, preferably 1–5%, by weight with about 10–40% each of water and humectant.

The dental creams should have a pH of about 5 to 6.5, preferably 5.2 to 6.2, since this pH range is considered the most practicable for use. Where reference is made to pH herein, it is intended that such pH determination be made on the dental cream directly. If necessary, acidifying agents or basic materials may be added to adjust the pH within the desired range. Where highly acidic fluoride compounds such as stannous fluoride are employed, the pH of the resulting cream will be usually about 5.5, though it will vary somewhat depending upon the proportions and the other ingredients. In the case of sodium fluoride and the like, the pH will be higher ordinarily and a suitable acidifying agent such as citric acid or other weak organic acid may be employed in varying amount if necessary to adjust the pH of the dental cream.

Various other materials may be incorporated in such dentifrice preparations. Added materials in the formulation may be suitably selected and used in proper amount depending upon the particular type of preparation. Such materials as soluble saccharin, flavoring oils (e.g. oils of spearmint, peppermint, wintergreen), coloring or whitening agents, (e.g. titanium dioxide), preservative (e.g. sodium benzoate), emulsifying agents, acidifying agents (e.g. citric acid), silicones, alcohol, menthol, chlorophyll compounds (e.g. sodium copper chlorophyllin), and the like may be used. Antibiotics such as penicillin, tetracycline, and tyrothrycin may be added also.

There may be employed also various calcium and magnesium ion suppression agents for adjustment of physical properties of the compositions. Suitable agents are the water-soluble inorganic polyphosphate salts, such as tetrasodium pyrophosphate or disodium diacid pyrophosphate, with the partially neutralized or acid polyphosphates preferred. Other suitable agents are the alkali metal, preferably sodium, salts of citric acid. In general, such compounds will be a minor amount or proportion of the formulation. The precise amount will vary depending upon the specific formulation, such as the physical characteristics of the dental cream, but will usually be from about 0.1% to about 3% by weight.

The following specific examples are further illustrative of the nature of the present invention, but it is to be understood that the invention is not limited thereto. The compositions are prepared in the usual manner and all amounts of the various ingredients are by weight unless otherwise specified.

*Examples I–III.—Dental cream*

|  | I | II | III |
|---|---|---|---|
| Sodium fluoride | 0.2 |  | 0.1 |
| Stannous fluoride |  | 0.4 |  |
| Insoluble sodium metaphosphate | 45.85 | 46.1 | 46.1 |
| Anhydrous dicalcium phosphate | 5.0 | 5.0 |  |
| Tricalcium phosphate |  |  | 5.0 |
| Sodium N-lauroyl sarcoside | 2.0 | 2.0 | 2.0 |
| Glycerine | 29.4 | 29.4 | 29.4 |
| Water | 14.4 | 14.3 | 14.5 |
| Sodium carboxymethylcellulose | 0.8 | 0.8 | 0.9 |
| Soluble saccharin | 0.2 | 0.2 | 0.2 |
| Sodium benzoate | 0.5 | 0.5 | 0.5 |
| Citric acid | 0.25 |  |  |
| Titanium dioxide | 0.4 | 0.4 | 0.4 |
| Flavor | 1.0 | 0.9 | 0.9 |
|  | 100.0 | 100.0 | 100.0 |

*Examples IV–V.—Dental cream*

|  | IV | V |
|---|---|---|
| Sodium fluoride | 0.2 | 0.2 |
| Aluminum oxide trihydrate | 1.0 | 5.0 |
| Insoluble sodium metaphosphate | 44.85 | 40.85 |
| Anhydrous dicalcium phosphate | 5.0 | 5.0 |
| Sodium N-lauroyl sarcoside | 2.0 | 2.0 |
| Citric acid | 0.1 | 0.25 |
| Glycerine | 29.4 | 29.4 |
| Water | 12.6 | 14.4 |
| Irish Moss gum | 0.9 | 1.0 | the balance of the formulations being small amounts of preservative, saccharin, color and flavor. These dental creams have a pH from about 5.8 to 6.2. They exhibit satisfactory stability during aging.

Examples VI–VII.—Tooth powder

|  | VI | VII |
|---|---|---|
| Sodium N-lauroyl sarcoside | 4.0 | 4.0 |
| Sodium fluoride | 0.4 | -------- |
| Stannous fluoride | -------- | 0.8 |
| Insoluble sodium metaphosphate | 82.95 | 82.95 |
| Anhydrous dicalcium phosphate | 10.0 | 10.0 |
| Soluble sacharin | 0.15 | 0.15 |
| Flavor | 2.5 | 2.5 |
|  | 100.0 | 100.0 |

In each of the above tooth powder formulas, a minor amount (e.g. 5%) of magnesium silicate may be added or partially substituted for the dicalcium phosphate to adjust the density and other physical properties if desired.

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention, what is claimed is:

1. A dentifrice preparation which comprises an anti-caries fluoride compound releasing fluoride ions in water and at least about 20% by weight of a compatible polishing material comprising a mixture of a major proportion of an insoluble alkali metal metaphosphate and a minor proportion of a material selected from the group consisting of insoluble calcium and magnesium polishing agents.

2. A dentifrice preparation which comprises about 0.05 to 2% by weight of an alkali metal fluoride and at least about 20% by weight of a mixture of a major proportion of insoluble sodium metaphosphate polishing agent and a minor proportion of a calcium phosphate polishing agent.

3. A dentifrice preparation which comprises about 0.05 to 2% by weight of stannous fluoride and at least about 20% by weight of a mixture of a major proportion of insoluble sodium metaphosphate polishing agent and a minor proportion of a calcium phosphate polishing agent.

4. A dentrifice preparation comprising about 0.05 to 2% by weght of an anti-caries fluoride salt releasing fluoride ions in water, at least about 20% of a fluoride-compatible polishing material comprising a mixture of a major proportion of insoluble sodium metaphosphate and a minor proportion of anhydrous dicalcium phosphate.

5. A dental cream comprising about 0.05 to about 2% by weight of an inorganic anti-caries fluoride salt releasing fluoride ions in water and at least about 20% of a fluoride-compatible polishing material comprising a mixture of insoluble sodium metaphosphate and a material selected from the group consisting of calcium and magnesium polishing agents, the ratio of said insoluble metaphosphate to said material being from about 100:1 to about 3:2 by weight.

6. A dental cream in accordance with claim 5 containing sodium fluoride.

7. A dental cream in accordance with claim 5 containing stannous fluoride.

8. A dentifrice preparation comprising a small amount of an anti-caries fluoride compound releasing fluoride ions in water; a substantially saturated aliphatic acyl amide of an aliphatic saturated mono-amino carboxylic acid compound having 2 to 6 carbon atoms, the aliphatic acyl group having about 12 to 16 carbon atoms, and additionally less than 15% based on said amide of higher fatty acid material, the amount of said higher fatty acid material being insufficient to substantially adversely affect said amide; and at least about 20% of a polishing material comprising a major proportion of insoluble alkali metal metaphosphate and a minor proportion of a material selected from the group consisting of insoluble calcium and magnesium polishing agents.

9. A dentifrice preparation comprising about 0.5 to 5% by weight of a substantially saturated N-fatty acyl sarcoside having 12 to 16 carbon atoms in said acyl group and additionally less than 10% of higher fatty acid material by weight of said sarcoside, about 0.05 to 2% by weight of an anti-caries fluoride compound releasing fluoride ions in water, and at least about 20% of a polishing material comprising a major proportion of insoluble sodium metaphosphate and a minor proportion of anhydrous dicalcium phosphate.

10. A dentifrice in accordance with claim 9 which contains sodium fluoride.

11. A dentifrice in accordance with claim 9 wherein the ratio of said insoluble sodium metaphosphate to anhydrous dicalcium phosphate is about 9:1 by weight.

12. A dental cream comprising about 2% by weight of an N-lauroyl sarcoside compound and additionally less than about 10% of higher fatty acid material by weight of the sarcoside, about 0.05 to 2% by weight of an alkali metal fluoride, and at least about 20% of a mixture of insoluble sodium metaphosphate and anhydrous dicalcium phosphate in a ratio of about 9:1 by weight.

13. A dental cream comprising at least about 20% by weight of a mixture of a major proportion of insoluble sodium metaphosphate and a minor proportion of a calcium phosphate suspended in a gel comprising water, humectant, and gelling agent, about 0.05 to 2% by weight of an anti-caries fluoride compound which releases fluoride ions in water, about 0.5 to 5% by weight of an N-higher fatty acyl sarcoside having 12 to 16 carbon atoms in said acyl group and additionally less than about 10% of higher fatty acid material by weight of said sarcoside, and about ¼ to 10% by weight of hydrated aluminum oxide, said dental cream having a pH from 5 to 6.5.

14. A dental cream comprising about 40 to 50% insoluble sodium metaphosphate and about 1 to 10% anhydrous dicalcium phosphate suspended in a gel comprising about 10 to 40% water and 10 to 40% humectant, about 0.2% sodium fluoride, about 2% sodium N-lauroyl sarcoside and additionally less than about 10% of higher fatty acid material by weight of said sarcoside, and about ½ to 10% by weight of aluminum oxide trihydrate, said dental cream having a pH from 5 to 6.5.

15. A dentifrice comprising from 0.01 to 2.0 percent of a water-soluble anti-caries fluoride and at least about 20 percent of a compatible polishing agent mixture, said mixture comprising a major proportion of a substantially water-insoluble alkali metal polymetaphosphate and a minor proportion of a material selected from the group consisting of insoluble calcium and magnesium polishing agents.

16. A dentifrice comprising stannous fluoride and at least about 20%, by weight of the dentifrice, of a compatible abrasive, said abrasive comprising a major proportion of insoluble sodium metaphosphate and a minor proportion of insoluble calcium orthophosphate, said dentifrice having a pH of about 5.5.

17. A dentifrice comprising a water-soluble ionizable, anti-caries fluoride and at least about 20 percent, by weight of the dentifrice, of a compatible abrasive, said abrasive comprising a major proportion of a water-insoluble sodium metaphosphate and a minor proportion of a water-insoluble calcium phosphate.

18. A dentifrice preparation in accordance with claim 1 which contains about 0.05 to 10% by weight of a water-soluble organic detergent.

19. A dentifrice preparation in accordance with claim 1 wherein the fluoride compound is selected from the group consisting of an alkali metal fluoride, a stannous fluoride, an ammonium fluoride, a copper fluoride and a fluorosilicate compound, said fluoride compound inhibiting the solubility of tooth enamel in acid solution.

20. A dentifrice preparation in accordance with claim 17 which contains about 0.4% stannous fluoride and the ratio of said insoluble sodium metaphoshphate to said calcium phosphate is from about 50:1 to 4:1 by weight.

21. A dental cream comprising about 0.05 to 2% by weight of a stannous fluoride compound, about 0.5 to 5% by weight of a water-soluble synthetic organic detergent, and at least about 20% of a polishing material comprising a mixture of insoluble sodium metaphosphate and a calcium phosphate in a ratio from about 50:1 to 4:1 by weight, said dental cream having a pH from about 5 to 6.5.

22. A dental cream comprising about 0.4% stannous fluoride, about 40 to 60% by weight of a compatible polishing material comprising a major proportion of insoluble sodium metaphosphate and about 1 to 10% of a calcium phosphate, and about 0.5 to 5% by weight of a water-soluble anionic organic synthetic detergent suspended in a gel comprising about 10 to 40% by weight of water and 10 to 40% by weight of humectant.

23. A dental cream in accordance with claim 22 wherein said calcium phosphate is anhydrous dicalcium phosphate.

24. A dental cream in accordance with claim 22 which contains about ¼ to 10% by weight of hydrated aluminum oxide.

25. A dentifrice in accordance with claim 15 containing calcium carbonate as calcium polishing agent.

26. A dentifrice in accordance with claim 15 containing magnesium carbonate as magnesium polishing agent.

27. A dentifrice in accordance with claim 15 containing calcium orthophosphate as calcium polishing agent.

28. A dentifrice in accordance with claim 15 containing magnesium orthophosphate as magnesium polishing agent.

References Cited by the Examiner

UNITED STATES PATENTS

| | | | |
|---|---|---|---|
| 1,943,856 | 1/1934 | Cross | 167—93 |
| 2,194,218 | 3/1940 | Dickeson | 167—93 |
| 2,211,369 | 8/1940 | Durgin | 167—93 |
| 2,216,816 | 10/1940 | Kuever | 167—93 |
| 2,216,821 | 10/1940 | Long | 167—93 |
| 2,627,493 | 2/1953 | Merckel | 167—93 |
| 2,689,170 | 9/1954 | King | 167—93 |
| 2,700,012 | 1/1955 | Merckel | 167—93 |
| 2,723,217 | 11/1955 | Gershon | 167—93 |
| 2,772,203 | 11/1956 | Salzmann | 167—93 |

FOREIGN PATENTS

| | | |
|---|---|---|
| 134,156 | 9/1947 | Australia. |
| 498,686 | 12/1953 | Canada. |
| 572,352 | 10/1945 | Great Britain. |
| 644,339 | 10/1950 | Great Britain. |

OTHER REFERENCES

J.A.D.A., vol. 34, Jan. 1, 1947, pp. 26–32.
J.A.D.A., vol. 40 (1950), pp. 513–519.
J.A.D.A., vol. 50, February 1955, pp. 163–166.
Jour. Dent. Res., vol. 25, August 1946, pp. 207–211.

JULIAN S. LEVITT, *Primary Examiner.*

MORRIS O. WOLK, LEWIS GOTTS, *Examiners.*